United States Patent
Bae et al.

(10) Patent No.: US 8,869,375 B2
(45) Date of Patent: Oct. 28, 2014

(54) DOORBELT MOLDING FOR VEHICLE AND METHOD FOR MANUFACTURING DOORBELT MOLDING

(71) Applicants: Hyundai Motor Company, Seoul (KR); Kia Motors Corporation, Seoul (KR)

(72) Inventors: Chul Hong Bae, Gyeonggi-do (KR); Chang Yeol Yoo, Gyeonggi-do (KR); Kwang Min Yoon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/688,614

(22) Filed: Nov. 29, 2012

(65) Prior Publication Data

US 2014/0059939 A1    Mar. 6, 2014

(30) Foreign Application Priority Data

Aug. 30, 2012  (KR) .................. 10-2012-0095461

(51) Int. Cl.

| | |
|---|---|
| *B21B 1/46* | (2006.01) |
| *C25D 11/02* | (2006.01) |
| *B21B 1/00* | (2006.01) |
| *C25D 11/04* | (2006.01) |
| *B60J 10/04* | (2006.01) |
| *B29C 41/22* | (2006.01) |

(52) U.S. Cl.
CPC ............... *B29C 41/22* (2013.01); *C25D 11/02* (2013.01); *B21B 1/00* (2013.01); *C25D 11/04* (2013.01); *B60J 10/041* (2013.01)
USPC .................................................. 29/527.1

(58) Field of Classification Search
CPC .......... B29C 1/22; B29C 41/22; B60J 10/041; C25D 11/02; C25D 11/04; B21B 1/00; B21B 1/46; B32B 15/08; B32B 27/00; B05C 1/083

USPC ............. 29/527.1, 527.2, 460, 458, 453, 428; 204/492; 428/425.1; 49/475.1; 427/289
See application file for complete search history.

(56) References Cited

U.S. PATENT DOCUMENTS 3,846,269 A * 11/1974 Martello et al. ........... 428/425.8
2009/0045651 A1   2/2009 Binder et al.

FOREIGN PATENT DOCUMENTS

| KR | 10-0410897 | 10/2002 |
|---|---|---|
| KR | 10-0818145 | 3/2008 |
| KR | 10-0839978 | 6/2008 |
| KR | 10-2008-0096002 | 10/2008 |
| KR | 100936159 B1 | 1/2010 |
| KR | 10-1124988 | 5/2011 |
| KR | 1020110080093 | 7/2011 |

* cited by examiner

*Primary Examiner* — John C Hong
(74) *Attorney, Agent, or Firm* — Edwards Wildman Palmer LLP; Peter F. Corless

(57) ABSTRACT

The present invention provides a method for manufacturing the doorbelt molding including: forming an anodized layer on a surface of an aluminum alloy plate by performing an anodizing treatment on the aluminum alloy plate; forming a clear coating layer on the anodized layer by performing a clear coating treatment on the aluminum alloy plate on which the anodized layer is formed; molding a sectional shape of an outer frame by roll-forming the aluminum alloy plate over which the anodized layer and the clear coating layer are formed; forming a molding intermediate member in which the outer frame and an inner molding are integrally formed by integrally injection-molding a synthetic resin into the outer frame formed by the roll-forming, wherein the synthetic resin is a material of the inner molding; bending and cutting the molding intermediate member to manufacture the doorbelt molding.

11 Claims, 4 Drawing Sheets

DOORBELT MOLDING FOR VEHICLE AND METHOD FOR MANUFACTURING DOORBELT MOLDING

CROSS-REFERENCE TO RELATED APPLICATION

This application claims under 35 U.S.C. §119(a) the benefit of Korean Patent Application No. 10-2012-0095461 filed Aug. 30, 2012, the entire contents of which are incorporated herein by reference.

BACKGROUND (a) Technical Field

The present invention relates to a doorbelt molding for a vehicle and a method for manufacturing the doorbelt molding. More particularly, the present invention relates to a doorbelt molding for a vehicle and a method for manufacturing the doorbelt molding, which may improve productivity, and decrease the weight of the molding while exhibiting corrosion resistance.

(b) Background Art

Generally, a door glass moved by a mechanical or electric force is installed in a vehicle door as illustrated in FIG. 1. Additionally, a doorbelt molding may be attached to a door frame mounted with the door glass 3.

As shown in FIG. 1, the door belt molding 4 may be adhered to the outer surface of the door glass 3 to prevent impurities or rainwater from infiltrating into the door frame 2a, to guide the door glass 3, to prevent vibration of the door glass 3, and to improve the exterior of the door 2.

The doorbelt molding 4 may include an outer frame exposed to the exterior of the vehicle 1 along the line of the doorbelt, an inner molding contacting the door glass while integrally formed with the outer frame, an end piece sealing the end portion of the outer frame.

Typically, the outer frame is manufactured by continuously extruding or roll forming a metallic plate such as stainless steel (SUS).

In addition, the inner molding may be manufactured by injection molding of a synthetic resin such as polyvinyl chloride (PVC), and may include an inner frame formed of a metallic material inserted therein to maintain stiffness and shape. Furthermore, a synthetic resin integrally formed with the inner frame may be manufactured by injection molding.

Since the outer frame of the doorbelt molding is a surface member that forms the exterior of the door, outer frames formed of a glossy or semi-glossy metallic material are conventionally used to improve the exterior of the door and the vehicle.

For example, the outer frame in a conventional doorbelt molding may be manufactured with glossy stainless steel (SUS 430) and semi-glossy stainless steel (SUS 304). Furthermore, the inherent gloss of the stainless steel (SUS 430) may be used, or the surface of the SUS 304 plate may be embossed by a micro-shot process to achieve a semi-glossy effect by surface diffused reflection (e.g., diffused reflection by the embossed surface of the material).

However, since the conventional outer frame is exposed to the exterior of the vehicle without an additional surface treatment due to the corrosion resistance of the SUS material, when the outer frame is exposed to external corrosive environments for a long time, rust may occur. In additional, since the SUS material is expensive compared to other aluminum alloy materials, the manufacturing cost may increase. Furthermore, there are difficulties in changing its the color of the material, (e.g., implementing various types of colors).

Another conventional manufacturing method includes manufacturing an outer frame by performing surface treatment on an aluminum alloy plate other than SUS, manufacturing a separate inner molding including an inner frame (e.g., typical aluminum alloy plate) inserted therein (e.g., injection-molding synthetic resin integrally formed with inner frame), and assembling the two components by a fitting method. However, in this method, since two different components (e.g., an outer frame and an inner molding) are separately manufactured and then assembled, the productivity thereof may be reduced.

The above information disclosed in this hereinabove is only for enhancement of understanding of the background of the invention and therefore it may contain information that does not form the prior art that is already known in this country to a person of ordinary skill in the art.

SUMMARY OF THE INVENTION

The present invention provides a doorbelt molding for a vehicle and a method for manufacturing the doorbelt molding, which may improve manufacturing productivity and decrease the weight molding while exhibiting corrosion resistance.

In one aspect, the present invention provides a method for manufacturing a doorbelt molding for a vehicle, including: performing an anodizing treatment on the aluminum alloy plate to form an anodized layer on a surface of an aluminum alloy plate; performing a clear coating treatment on the aluminum alloy plate on which the anodized layer is formed to form a clear coating layer on the anodized layer; performing roll-forming of the aluminum alloy plate over which the anodized layer and the clear coating layer are formed to mold a sectional shape of an outer frame; performing an injection-molding of a synthetic resin into the outer frame, wherein the synthetic resin is a material of the inner molding to form a molding intermediate member in which the outer frame and an inner molding are integrally formed; and completing the doorbelt molding by performing a subsequent process including bending and cutting processes on the molding intermediate member.

In an exemplary embodiment, the aluminum alloy plate may be manufactured with a plate formed of 1000 series, 3000 series, or 5000 series aluminum alloy materials In another exemplary embodiment, the forming of the anodized layer may include forming an anodized layer with a thickness of about 3 micrometers (μm) to about 10 μm on the surface of the aluminum alloy plate.

In still another exemplary embodiment, in the forming of the anodized layer, the anodizing coating treatment may be continuously performed, by the processor, by winding the aluminum alloy plate around a winding roll and unwinding the aluminum alloy plate from an unwinding roll to immerse the aluminum alloy plate between the unwinding roll and the winding roll in an anodizing bath, and a traveling speed of the aluminum alloy plate in the anodizing bath may range from about 6 meters per minute (m/min) to about 8 m/min.

In yet another exemplary embodiment, the anodizing bath may include an anodizing coating solution containing about 10 grams per liter (g/l) to 15 g/l sodium silicate $(Na_2SiO_3).9$ water $(H_2O)$, about 3 g/l to 5 g/l potassium fluoride (KF) $.2H_2O$, and about 2 g/l to 4 g/l potassium hydroxide (KOH), and the anodizing coating treatment may be performed by passing the aluminum alloy plate through the coating solution that is maintained at a temperature of about 30° C. to 50° C. and applying a voltage of about 50 V to 70 V for about 1 to 2 minutes.

In still yet another exemplary embodiment, the forming of the clear coating layer may include forming a clear coating layer with a thickness of about 10 μm to 30 μm on the anodized layer.

In a further exemplary embodiment, in forming the clear coating layer, the clear coating treatment may be continuously performed by winding the aluminum alloy plate around a winding roll and unwinding the aluminum alloy plate from an unwinding roll to immerse the aluminum alloy plate between the unwinding roll and the winding roll in a bath containing a clear coating solution, and a traveling speed of the aluminum alloy plate in the clear coating bath may range from about 5 m/min to 7 m/min.

In another further exemplary embodiment, in forming of the clear coating layer, the clear coating solution in the clear coating bath may be maintained at a temperature of about 50° C. to 70° C.

In still another further exemplary embodiment, the aluminum alloy plate may be continuously surface-treated such that the forming of the anodized layer and the forming of the clear coating layer are performed while both ends of the aluminum alloy plate are being wound around the winding roll and unwound from the unwinding roll, and the forming of the anodized layer, the forming of the clear coating layer, the molding of the sectional shape of the outer frame, and the forming of the molding intermediate member may be sequentially performed.

In another aspect, the present invention provides a doorbelt molding for a vehicle, including an outer frame in which an anodized layer is disposed on a surface of an aluminum alloy plate and a clear coating layer is disposed on the anodized layer, and an inner molding may be disposed integrally with the outer frame by integrally an injection-molding of a synthetic resin into the outer frame.

BRIEF DESCRIPTION OF THE DRAWINGS

The above and other features, objects and advantages of the present invention will now be described in detail with reference to exemplary embodiments thereof illustrated in the accompanying drawings which are given hereinbelow by way of illustration only, and thus are not limitative of the present invention, and wherein.

Figure 1:
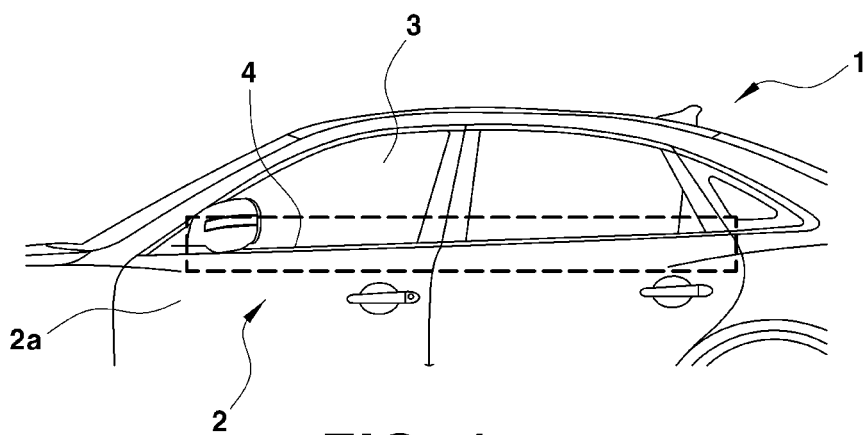
FIG. 1 is an exemplary side view illustrating a vehicle equipped with a doorbelt molding, according to the related art.

Reference numerals set forth in the Drawings includes reference to the following elements as further discussed below:

| 1: vehicle | 2: door |
| 2a: door frame | 3: door glass |
| 4: doorbelt molding | 5: outer frame |
| 6: aluminum alloy plate | 7a: anodized layer |
| 7b: clear coating layer | 8: inner molding |
| 9a: end piece | 9b: pad |
| 11: unwinding roll | 12: winding roll |
| 13: anodizing bath | 14: clear coating bath |

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF PREFERRED EMBODIMENTS

Hereinafter reference will be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention relates a doorbelt molding for a vehicle and a method for manufacturing the doorbelt molding, which may improve manufacturing productivity, and reduce the weight of the molding while exhibiting corrosion resistance.

In the manufacturing method of the present invention an outer frame may be manufactured by anodizing (e.g., anodic oxidation) treatment, clear coating treatment, and roll-forming and an inner molding may be integrally injection-molded into the roll-formed outer frame.

Figure 2:
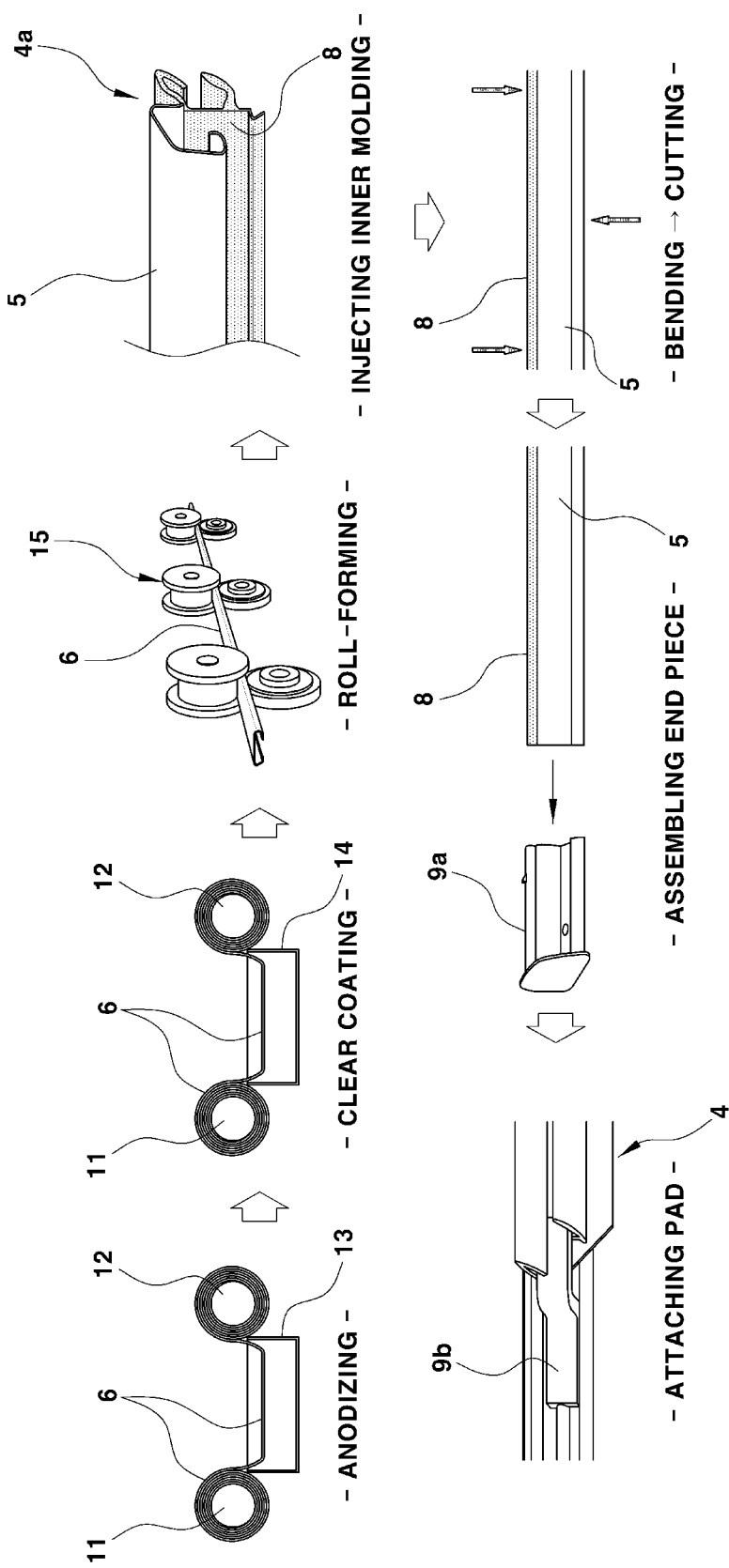
FIG. 2 is an exemplary view illustrating a method of manufacturing a doorbelt molding according to an exemplary embodiment of the present invention.

As shown in FIG. 2, the manufacturing method according to an exemplary embodiment of the present invention may include a process of anodizing an aluminum alloy plate 6 used as a material for an outer frame 5, a process of clear-coating the anodized plate 6, a process of forming a sectional shape of the outer frame 5 by roll-forming the anodized and clear coated plate 6, integrally injection-molding a synthetic resin into the roll-formed outer frame 5 to manufacture a molding intermediate member 4a in which the outer frame 5 and the inner molding 8 are integrally formed, wherein the synthetic resin is a material of an inner molding 8. The above processes may be sequentially performed, and then subsequent processes including bending and cutting processes may be performed on the molding intermediate member 4a to manufacture a door belt molding 4.

In this embodiment, a conventional aluminum alloy plate that is relatively inexpensive may be used as a material of the outer frame 5 instead of an expensive stainless steel (SUS) conventionally used as a material of the outer frame in a semi-glossy molding.

The outer frame 5 may include a plate formed of one of 1000 series (or expressed as 1XXX series), 3000 series (3XXX series), and 5000 series (5XXX series) aluminum alloy material. Examples of an available alloy material are shown in Table 1 below.

TABLE 1

| Division | Content and Composition (wt %) | | | | | | | | |
|---|---|---|---|---|---|---|---|---|---|
| | Cr | Cu | Fe | Mg | Mn | Si | Ti | Zn | Al |
| A 1050 | below 0.05 | below 0.1 | below 0.4 | below 0.05 | below 0.05 | below 0.25 | below 0.03 | below 0.05 | rest |
| A 5052 | 0.15~0.35 | below 0.1 | below 0.4 | 2.2~2.8 | below 0.1 | below 0.25 | below 0.015 | below 0.1 | rest |
| A 5754 | below 0.3 | below 0.1 | below 0.4 | 2.6~3.6 | below 0.5 | below 0.4 | below 0.15 | below 0.2 | rest |
| A 3005 | below 0.1 | below 0.3 | below 0.7 | 0.2~0.6 | 1.0~1.5 | below 0.6 | below 0.1 | below 0.25 | rest |

Figure 3:
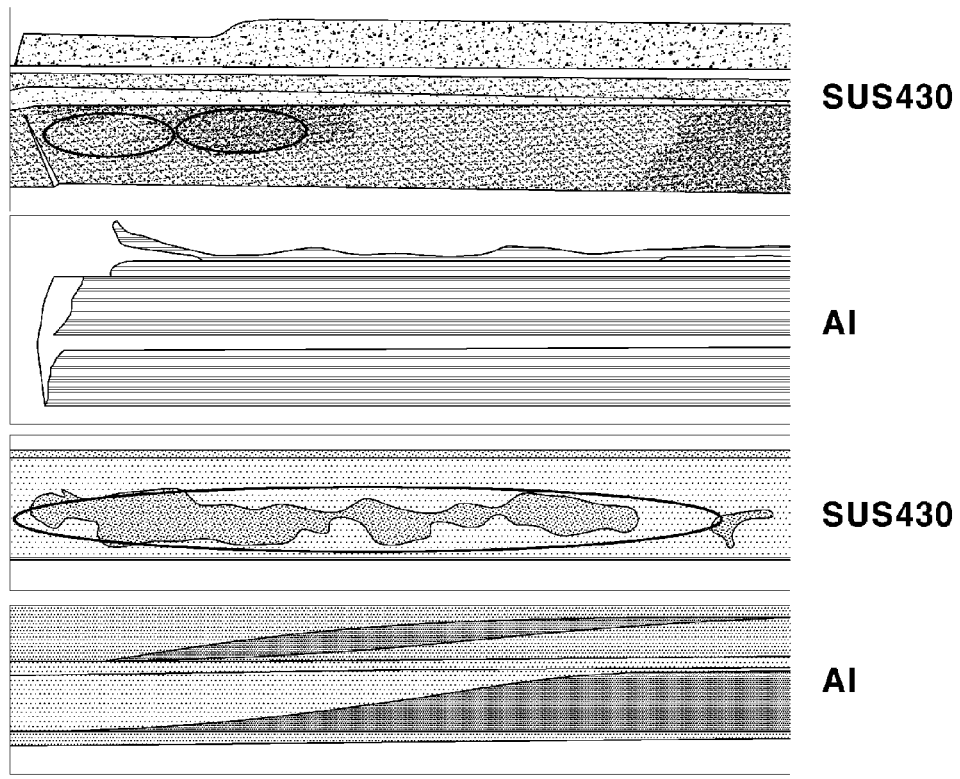
FIG. 3 is an exemplary cross-sectional view illustrating a surface-treated aluminum alloy plate constituting an outer frame according to an exemplary embodiment of the present invention.

In an embodiment of the present invention, an aluminum alloy plate 6 having a particular width may be used as a plate formed of the above-mentioned alloy materials. Moreover, the aluminum alloy plate 6, as shown in FIG. 2, may be continuously surface-treated by an anodizing process and a clear coating process while allowing both end portions of the aluminum alloy plate to be wound around rolls 11 and 12. The section of the surface-treated alloy plate is shown in FIG. 3 (showing the sectional structure of a final outer frame 5).

In the anodizing process, detailed processes such as cleaning, etching, activation, coating, sealing, and drying are performed on the aluminum alloy plate 6 to form an anodized layer 7a on the surface of the aluminum alloy plate 6. In the coating process, as shown in FIG. 2, the plate 6 may be immersed (e.g., immersed in an anodizing coating solution) in an anodizing bath 13 to allow the continuous anodizing process to be performed. Moreover, the plate 6 may be unwound from an unwinding roll 11, and may be wound around a winding roll 12.

Furthermore, the plate 6 traveling through the anodizing bath 13 may move at a particular speed to form a particular thickness of the anodized layer 7a on the surface of the plate 6. In an exemplary embodiment, the anodized layer 7a may have a thickness of about 3 μm to 10 μm by continuously performing the anodizing treatment on the surface of the aluminum alloy plate 6 having a thickness of about 0.5 mm to 1.0 mm.

Specifically, when the thickness of the anodized layer 7a is substantially less than about 3 μm, the thickness of the anodized layer 7a may be too thin to prevent corrosion. Accordingly, sufficient corrosion resistance required for a finally molded product may be obtained, and corrosion may occur when the plate may be exposed to a corrosive environment while attached to a vehicle. On the other hand, when the thickness of the anodized layer 7a is greater than about 10 μm, the layer may be undesirably ruptured in a subsequent roll-forming process.

Additionally, in the continuous anodizing process of the plate using the winding and unwinding rolls 11 and 12, the conveying speed of the plate 6, (e.g., the traveling speed of the plate 6) in the bath 13 may be set to about 6 m/min to 8 m/min. However, when the transfer speed deviates from the above range, the final thickness of the anodized layer 7a may be too thin or too thick (e.g., the thickness of the anodized layer 7a may deviate from the above-mentioned thickness range).

The surface of the anodized layer 7a formed as above may be porous. Since the thickness of the layer may be thin, the inherent metallic color of the aluminum alloy plate 6 thereunder may be projected to the outside, and simultaneously, the surface gloss may become semi-glossy by the diffused reflection of the surface layer.

Table 2 below shows an exemplary anodizing treatment condition according to an embodiment of the present invention. The setting of the coating condition may be important to obtain a desired thickness of the anodized layer.

TABLE 2

| Division | Composition (Aqueous Solution) | Conditions |
|---|---|---|
| Cleaning | 30 g/l Na₃PO₄ | Cathodic cleaning for 0.5 to 3 mins Current density 1 to 4 A/dm, 4 to 6 V |
| Etching | 180 g/l CrO₃ | Immerse at 20° C. to 30° C. for 3 mins |
| Activation | 2 to 4 g/l KOH | Immerse at 20° C. to 30° C. for 2 mins |
| Coating | 10 to 15 g/l Na₂SiO₃·9H₂O, 3 to 5 g/l KF·2H₂O, 2 to 4 g/l KOH | Apply voltage of 50 V to 70 V at 40° C. for 1 to 2 mins |

TABLE 2-continued

| Division | Composition (Aqueous Solution) | Conditions |
|---|---|---|
| Sealing | ethylene | Immerse at 20° C. to 30° C. for 1 min |
| Drying | — | Maintain at 90 ± 10° C. for 10 to 20 mins |

As shown in Table 2, after a cleaning process using an $Na_3PO_4$ solution, an etching process of immersing the plate in a chromium trioxide ($CrO_3$) solution, and an activation process of immersing the plate in a KOH solution, an anodizing coating process of conveying the plate 6 through a coating solution that may be maintained in the anodizing bath 13 at a temperature of about 30° C. to 50° C. and applying a voltage of about 50 V to 70 V for about 1 to 2 minutes may be performed. Thereafter, a sealing process of immersing the plate 6 in ethylene of about 20° C. and a drying process of maintaining the plate 6 at a temperature of 90±10° C. for about 10 to 20 minutes may be performed to form the anodized layer 7a on the surface of the plate 6.

The coating solution used in the anodizing coating process may include about 10 g/l to 15 g/l $Na_2SiO_3.9H_2O$, about 3 g/l to 5 g/l $KF.2H_2O$, and about 2 g/l to 4 g/l KOH.

To form the anodized layer 7a with a thickness of about 3 μm to 10 μm on the surface of the aluminum alloy plate 6, the conditions of the coating process described above must be satisfied among the anodizing treatment conditions.

Among the anodizing process, the cleaning and etching processes may be performed to remove impurities from the surface of the aluminum alloy plate 6, and the activation process may be performed to neutralize the acidified surface of the plate 6 to facilitate the anodizing coating.

Additionally, the sealing process may be performed to fill pores of the surface that may be anodized (e.g., in which the anodized layer is formed), and the drying process may be performed to promote infiltration of the sealing solution into pores.

Thus, the anodized layer 7a may be an anodized film formed of aluminum oxide ($Al_2O_3$) with a thickness of about 3 μm to 10 μm may be formed on the surface of the aluminum alloy plate 6.

In the coating process of the anodizing process, when a dye is mixed and added to the coating solution, various colors such as red, blue, and gold may be reflected on the surface of the aluminum alloy plate 6, allowing the doorbelt molding to have a desired color. Thus, the present invention has an advantage of manufacturing various colors of products compared to the related art in which a SUS material is used.

Similarly to the anodizing process, the clear coating process may be performed by conveying the anodized plate 6 through the bath 14 containing a clear coating solution using the unwinding roll 11 and the winding roll 12. The plate 6 may be wound around the winding roll 12 while being unwound from the unwinding roll 11, and the plate 6 between the unwinding roll 11 and the winding roll 12 may be immersed in a coating solution of the clear coating bath 14 to allow the clearing coating treatment to be continuously performed. Furthermore, the movement speed of the plate 6 traveling through the clear coating bath 14 may be maintained at a particular speed such that a clear coating layer 7b with a desired thickness may be formed on the surface of the plate 6.

In an exemplary embodiment, the clear coating layer 7b with a thickness of about 10 μm to 30 μm may be formed on the anodized layer 7a of the aluminum alloy plate 6. When the clear coating layer 7b is formed to have a thickness of less than about 10 μm, sufficient corrosion resistance required for a molded product may not be obtained, and corrosion may occur when exposed to a corrosive environment while attached to a vehicle.

On the other hand, when the thickness of the clear coating layer 7b is greater than about 30 μm, the layer may be undesirably ruptured in a subsequent roll-forming process.

Table 3 below shows an exemplary clear coating condition according to an exemplary embodiment of the present invention, which illustrates the composition and the content range of a desired clear coating solution.

TABLE 3

| Chemicals | CAS No. | Content (wt %) |
|---|---|---|
| Cyclohexanone | 108-94-1 | 15 to 20 |
| Blocked Isocyanate | — | 20 to 30 |
| Polyester | — | 30 to 40 |
| Aromatic Solvent | 64742-95-6 | 15 to 20 |
| Micronized Silica | 7631-86-9 | 4 to 8 |
| Other Additives | — | 1 to 5 |

In addition, in the continuous clear coating process of the plate 6 using the rolls 11 and 12, the conveying speed of the plate 6, (e.g., the conveying speed of the plate 6) in the bath 14 may be set to about 5 m/min to 7 m/min to obtain the coating thickness of the above-mentioned range. Moreover, the temperature of the coating solution may be maintained at about 50° C. to 70° C. to obtain a substantially uniform clear coating layer 7b.

When the conveying speed is slower than about 5 m/min, the coating thickness may deviate from the above-mentioned range and thus may become too thick. On the other hand, when the conveying speed is faster than about 7 m/min, the coating thickness may deviate from the above-mentioned range and thus may become too thin.

When the coating temperature is less than about 50° C., an orange peel may occur on the surface of the clear coating layer 7b due to an incomplete filling of the mold or a rough and porous finish. On the other hand, when the coating temperature is maintained at a temperature greater than about 70° C., the coating solution may not remain on the surface of the plate 6, making coating difficult.

The clear coating layer 7b formed by the above process condition may serve to improve the corrosion resistance of the plate 6 by blocking humidity and salt water. When only the anodized layer 7a is formed without the clear coating layer 7b, the surface of the anodized plate 6, i.e., the surface of the anodized layer may be directly exposed to the outside, causing significant reduction of the corrosion resistance. Accordingly, in this embodiment, the clear coating process may be performed after the anodizing treatment. Thus, the aluminum alloy plate may exhibit improved corrosion resistance.

After the anodized layer 7a and the clear coating layer 7b are formed on the surface of the aluminum alloy plate 6 through the surface treatment process, the surface-treated aluminum alloy plate 6 may be mounted into a roll-forming machine 15 to continuously form the sectional shape of the outer frame 5.

Thereafter, after the outer frame 5 is completed, the inner molding 8 that may reduce friction upon raising and lowering of the door glass may be injection-molded into the outer frame 5 in a subsequent process to form a molding intermediate member 4a in which the outer frame 5 and the inner molding 8 are integrally formed. Moreover, the inner molding 8 may be formed of a PVC material, which is integrally injection-molded into the outer frame 5 to complete the molding intermediate member 4a in which the outer frame 5 formed of an aluminum alloy plate and the inner molding 8 formed of PVC are integrally formed.

Thereafter, as a subsequent process, bending of the molding intermediate member 4a, assembling of the end piece 9a, and attachment of the pad 9b may be performed to complete the doorbelt molding 4. Thus, a final doorbelt molding using a relatively inexpensive aluminum alloy plate (1000 series, 3000 series, or 5000 series aluminum alloy plate) may be provided.

Thus, in this embodiment, a doorbelt molding with exhibiting improved corrosion resistance may be manufactured using a relatively inexpensive aluminum alloy. Finally, in the manufacturing of the doorbelt molding, the manufacturing cost can be reduced, and the weight of the molding decreases, implementation of various colors (semi-glossy, matt, aluminum metal color, or other various color), and manufacture of products exhibiting improved corrosion resistance may be achieved.

Additionally, in the manufacturing method of the present invention, since anodizing and clear coating treatment may be consecutively performed and continuous PVC injection may be performed to manufacture the product, the manufacturing productivity may be improved and the manufacturing cost may be reduced compared to a conventional manufacturing method in which an outer frame and an inner molding are separately manufactured and assembled by a fitting method.

Table 4 below shows a result of evaluating the roll-forming, PVC extrusion, bending, and assembling characteristics of the outer frame in which the anodizing treatment and the clear coating treatment are performed in the manufacturing process of the present invention. As described above, these characteristics satisfy particular evaluation criteria when the outer frame that the anodizing treatment and the clear coating treatment are performed.

TABLE 4

| Evaluation Item | Result |
| --- | --- |
| Roll-Forming | Satisfied |
| PVC extrusion | Satisfied |
| Bending | Satisfied |
| Assembling | Satisfied |

In addition, Table 5 below shows properties of 1000 series, 3000 series, and 5000 series aluminum alloy plates that may be used as a material of the outer frame. More specifically, the evaluation results of the properties of A 1050, A 3005, A 5052, and A 5754 are shown in Table 5.

TABLE 5

| Division Material of outer frame | Present Invention | | | | | |
| --- | --- | --- | --- | --- | --- | --- |
| | A 1050 | | | A 3005 | A 5052 | A 5754 |
| Yield strength (Y.S) (Mpa) | 140 | | | 170 | 197 | 220 |
| Tensile strength (U.T.S) (Mpa) | 160 | | | 190 | 241 | 250 |
| Elongation (E.L) (%) | 10 | | | 7 | 7.5 | 10 |
| Thickness (t) of outer frame (mm) | 0.5 | 0.7 | 0.8 | 0.5 | 0.5 | 0.5 |
| Y.S × t² (dent resistance ∝ Y.S × t²) | 35 | 68.6 | 89.6 | 80.3 | 82.6 | 85.3 |
| Dent resistance displacement (mm) | 0.7 | 0.3 | 0.2 | 0.4 | 0.3 | 0.2 |

Also, Table 6 below shows results of a single item and on-vehicle test regarding a doorbelt molding manufactured according to an embodiment of the present invention, which shows results of a water resistance test, a thermal cyclic resistance test, a salt spray test (SST), and a composite cyclic corrosion test (CCT). Table 6, illustrates change occurring on the exterior of a product manufactured according to an embodiment of the present invention.

TABLE 6

| Item | | Result |
| --- | --- | --- |
| Environmental resistance | Water resistance | No change on exterior |
| | Thermal cyclic resistance | No change on exterior |
| Corrosion resistance | SST | No change on exterior |
| | CCT | No change on exterior |
| Weather resistance | | No change on exterior |

Figure 4:
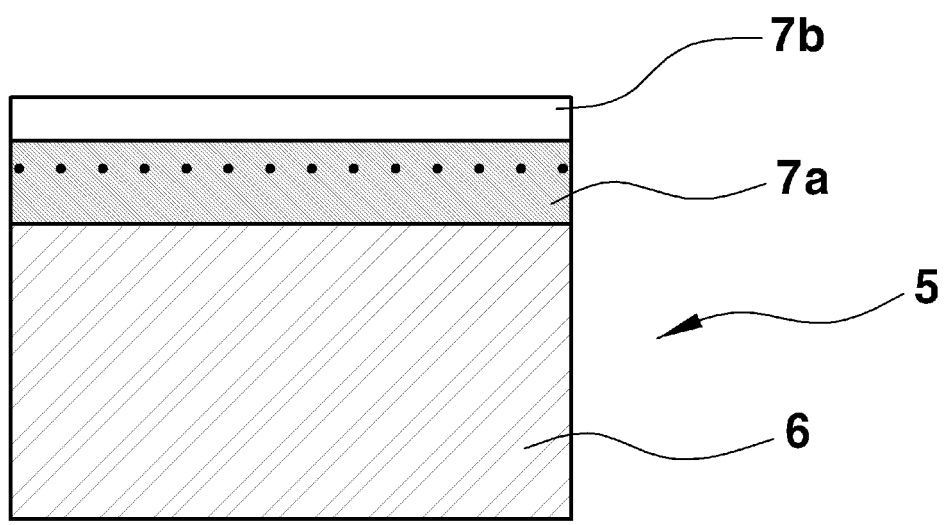
FIG. 4 is an exemplary image illustrating a change of the exterior of a conventional product and a product according to an exemplary embodiment of the present invention.

Additionally, FIG. 4 illustrates exterior changes on a conventional product (e.g., SUS 430 used as a material of the outer frame) and a product manufactured according to an embodiment of the present invention. Corrosion (indicated by an ellipse) may in a conventional product (e.g., SUS 430), whereas no change occurs on the exterior of a product (e.g., made from Al) manufactured according to an exemplary embodiment of the present invention.

According to an embodiment of the present invention, a doorbelt molding having improved corrosion resistance may be manufactured using a relatively inexpensive and light aluminum alloy. Additionally, in the manufacture of the doorbelt molding, it may be possible to manufacture the products in a variety of colors. Furthermore, since anodizing and a clear coating treatment are consecutively performed and continuous PVC injection is performed to manufacture an integral product, the manufacturing productivity may be improved and the manufacturing cost may be decreased in comparison to a conventional manufacturing method in which an outer frame and an inner molding are separately manufactured and assembled by a fitting method.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a doorbelt molding for a vehicle, comprising:
    forming an anodized layer on a surface of an aluminum alloy plate by performing an anodizing treatment on the aluminum alloy plate;
    forming a clear coating layer on the anodized layer by performing a clear coating treatment on the aluminum alloy plate on which the anodized layer is formed;

molding a sectional shape of an outer frame by roll-forming the aluminum alloy plate over which the anodized layer and the clear coating layer are formed;

forming a molding intermediate member in which the outer frame and an inner molding are integrally formed by injection-molding a synthetic resin into the outer frame formed by the roll-forming, wherein the synthetic resin is a material of the inner molding; and bending and cutting the molding intermediate member to manufacture the doorbelt molding, wherein in the forming of the anodized layer, the anodizing treatment is continuously performed by winding the aluminum alloy plate around a winding roll and unwinding the aluminum alloy plate from an unwinding roll to immerse the aluminum alloy plate between the unwinding roll and the winding roll in an anodizing bath.

2. The method of claim 1, wherein the aluminum alloy plate is manufactured with a plate formed of an aluminum alloy plate series selected from a group consisting of: a 1000 series, a 3000 series, and a 5000 series aluminum alloy materials.

3. The method of claim 1, wherein the forming of the anodized layer comprises forming an anodized layer with a thickness of about 3 μm to 10 μm on the surface of the aluminum alloy plate.

4. The method of claim 1, wherein a conveying speed of the aluminum alloy plate in the anodizing bath ranges from 6 m/min to 8 m/min.

5. The method of claim 1, wherein the anodizing bath comprises an anodizing coating solution containing about 10 g/l to 15 g/l $Na_2SiO_3.9H_2O$, about 3 g/l to 5 g/l $KF.2H_2O$, and about 2 g/l to 4 g/l KOH.

6. The method of claim 1, wherein the anodizing treatment is performed by conveying the aluminum alloy plate through the coating solution maintained at a temperature of about 30° C. to 50° C. and applying a voltage of about 50 V to 70 V for about 1 to 2 minutes.

7. The method of claim 1, wherein the forming of the clear coating layer comprises forming a clear coating layer with a thickness of about 10 μm to 30 μm on the anodized layer.

8. The method of claim 7, wherein in the forming of the clear coating layer, the clear coating treatment is continuously performed by winding the aluminum alloy plate around a winding roll and unwinding the aluminum alloy plate from an unwinding roll to immerse the aluminum alloy plate between the unwinding roll and the winding roll in a bath containing a clear coating solution.

9. The method of claim 7, wherein a conveying speed of the aluminum alloy plate in the clear coating bath ranges from about 5 m/min to 7 m/min.

10. The method of claim 8, wherein in the forming of the clear coating layer, the clear coating solution in the clear coating bath is maintained at a temperature of about 50° C. to 70° C.

11. The method of claim 1, wherein the aluminum alloy plate is continuously surface-treated such that the forming of the anodized layer and the forming of the clear coating layer are performed while both ends of the aluminum alloy plate are wound around the winding roll and the unwinding roll, and the forming of the anodized layer, the forming of the clear coating layer, the molding of the sectional shape of the outer frame, and the forming of the molding intermediate member are sequentially performed.

* * * * *